US012759506B2

(12) United States Patent
Ehrmann et al.

(10) Patent No.: US 12,759,506 B2
(45) Date of Patent: Oct. 13, 2026

(54) ROOF ASSEMBLY COMPRISING A CLEANING FEATURE AND MOTOR VEHICLE COMPRISING A CLEANING FEATURE

(71) Applicant: Webasto SE, Stockdorf (DE)

(72) Inventors: Maximilian Ehrmann, Stockdorf (DE); Magnus Sviberg, Stockdorf (DE); Cédric Langlais, Stockdorf (DE); Michael Hülsen, Stockdorf (DE)

(73) Assignee: WEBASTO SE, Stockdorf (DE)

(*) Notice: Subject to any disclaimer, the term of this patent is extended or adjusted under 35 U.S.C. 154(b) by 612 days.

(21) Appl. No.: 18/199,768

(22) Filed: May 19, 2023

(65) Prior Publication Data

US 2023/0373443 A1 Nov. 23, 2023

(30) Foreign Application Priority Data

May 23, 2022 (DE) ..................... 10 2022 112 923.3

(51) Int. Cl.

*B60S 1/28* (2006.01)
*B60S 1/04* (2006.01)
*B60S 1/16* (2006.01)
*B60S 1/52* (2006.01)
*B60S 1/56* (2006.01)
*B62D 25/06* (2006.01)

(52) U.S. Cl.

CPC ............... *B60S 1/28* (2013.01); *B60S 1/0458* (2013.01); *B60S 1/16* (2013.01); *B60S 1/522* (2013.01); *B60S 1/566* (2013.01); *B62D 25/06* (2013.01)

(58) Field of Classification Search

USPC ................... 296/210, 215, 218, 216.06, 84.1
See application file for complete search history.

(56) References Cited

U.S. PATENT DOCUMENTS 2,066,500 A * 1/1937 Westrope ................ B60S 1/043 296/96.17
2,787,018 A * 4/1957 Smith ................... B60S 1/3406 15/250.23
3,082,462 A * 3/1963 Barenyi ................ B60S 1/0452 15/250.3
3,127,116 A * 3/1964 Pollock ................. B60T 17/226 239/284.2
4,210,360 A * 7/1980 Powers ..................... B60P 3/42 296/218

(Continued)

FOREIGN PATENT DOCUMENTS

WO WO-2008013490 A1 * 1/2008 .............. B60S 1/566

*Primary Examiner* — Amy R Weisberg
*Assistant Examiner* — Veronica M Condo
(74) *Attorney, Agent, or Firm* — Fitch, Even, Tabin & Flannery, LLP

(57) ABSTRACT

A roof assembly for forming a vehicle roof of a motor vehicle. The roof assembly may have a panel component at least partially forming a roof skin of the vehicle roof, the roof skin serving as an outer sealing surface, at least one environment sensor configured to send and/or receive electromagnetic signals through a see-through area to detect a vehicle environment, and at least one cleaning feature. The cleaning feature may have a window wiper assembly having two wiper elements which have a common pivot axis, the one wiper element being configured to clean a windshield or a rear window and the other wiper element being configured to clean the see-through area.

19 Claims, 3 Drawing Sheets

(56) References Cited

U.S. PATENT DOCUMENTS

| | | | | |
|---|---|---|---|---|
| 4,874,200 | A * | 10/1989 | Nasu | B62D 23/00<br>296/193.04 |
| 4,883,310 | A * | 11/1989 | Miyazaki | B62D 25/06<br>296/210 |
| 5,119,524 | A * | 6/1992 | Miller | B60S 1/3409<br>15/250.23 |
| 5,795,014 | A * | 8/1998 | Balgaard | B62D 25/06<br>296/210 |
| 7,895,703 | B2 * | 3/2011 | Ina | B60J 5/101<br>296/180.1 |
| 8,020,247 | B2 * | 9/2011 | Katou | B62D 35/007<br>15/250.31 |
| 9,499,133 | B2 * | 11/2016 | Grasso | B60S 1/524 |
| 9,511,749 | B2 * | 12/2016 | Shibusawa | B60S 1/482 |
| 9,676,369 | B2 * | 6/2017 | Kaminaga | B60S 1/485 |
| 2016/0096512 | A1 * | 4/2016 | Giraud | B60S 1/48<br>15/250.04 |

* cited by examiner

ROOF ASSEMBLY COMPRISING A CLEANING FEATURE AND MOTOR VEHICLE COMPRISING A CLEANING FEATURE

CROSS-REFERENCE TO RELATED APPLICATION

This application claims priority from German Patent Application Number 10 2022 112 923.3, filed on May 23, 2022, which is hereby incorporated herein by reference in its entirety for all purposes.

FIELD

The invention relates to a roof assembly according to the preamble of claim 1 for forming a vehicle roof on a motor vehicle. Furthermore, the invention relates to a motor vehicle according to the preamble of claim 2.

BACKGROUND

Generic roof assemblies are widely used in vehicle manufacturing and are intended to form a vehicle roof. The roof assembly typically comprises a panel component, which at least partially forms a roof skin of the vehicle roof, the roof skin serving as an outer sealing surface. The at least one panel component thus prevents moisture or air flows from entering the vehicle interior. A panel component of this kind can be made of a stable material, such as painted metal or painted or solid-colored plastic. The known roof assemblies can additionally be configured as a rigid vehicle roof or can comprise an openable roof sub-assembly.

Moreover, roof assemblies comprising at least one environment sensor configured to send and/or receive electromagnetic signals through a see-through area are known in the vehicle development field of semi-autonomous or autonomous driving. After all, a plurality of environment sensors (e.g., lidar sensors, radar sensors, (multi-)cameras etc. including other (electrical) components) are needed to enable the vehicle controller to control the motor vehicle autonomously or semiautonomously. The environment sensors serve to detect an environment surrounding the motor vehicle. A vehicle environment can be reconstructed virtually from the acquired sensor data by data processing and/or data evaluation in order to determine a traffic situation, for example.

The environment sensors are commonly attached to or mounted on top of the vehicle roof since it typically is the highest point of a vehicle, from where the vehicle environment is easily visible. The environment sensors can be placed on top of the panel component as an attachment or can be disposed thereon in a retractable and deployable manner.

Also, roof assemblies that comprise a roof module are known. The roof modules are prefabricated as separate functional modules and can be delivered to the assembly line as functional units when assembling the vehicle. This reduces the complexity of production for the vehicle manufacturer. The at least one panel component of roof modules of this kind at least partially forms a roof skin of the vehicle roof, which prevents moisture and air flows from entering the vehicle interior. Roof modules that comprise a plurality of environment sensors are also known as roof sensor modules (RSM).

When the environment sensor is in use for detecting the vehicle environment, ambient conditions (e.g., weather) constantly pose the risk that a semi-transparent or transparent see-through area through which the environment sensor detects the vehicle environment accumulates dirt and becomes (more) opaque to the environment sensor as a result. As a consequence, the environment sensor detects interfering signals due to an unintended reflection or absorption of the electromagnetic radiation sent and/or received by the sensor on dirt particles. These interfering signals lead to a faulty detection or a faulty virtual reconstruction of the vehicle environment.

To avoid this problem, the use of cleaning features configured to clean the see-through area of an environment sensor in question is known. The known cleaning features typically comprise a combination of spray nozzles and wiper elements.

Typically, a cleaning fluid is first applied to the see-through area to remove or at least loosen dirt particles. In the case of environment sensors, the wiper element is moved, typically translationally, along the surface of the see-through area to be cleaned with a rubber blade disposed thereon following the spraying process so that dirt particles located on the surface are mechanically removed. The cleaning nozzles are preferably each disposed on the roof skin of the motor vehicle in front of the see-through area with respect to a direction of travel of the motor vehicle and spray the cleaning fluid onto the see-through area to be cleaned in the direction opposite to the direction of travel, typically with increased pressure.

This way of cleaning is sufficiently known from other areas of the motor vehicle, namely from window and/or headlight wiping systems. The known window wiping systems, in particular, comprise a combination of spray nozzles and wiper elements. First, a cleaning fluid is applied to the front window and/or the rear window through one or more than one spray nozzle in order to remove or at least loosen dirt particles. Following the spraying process, a window wiper having a rubber blade disposed thereon is pivoted across the surface of the front window and/or the rear window to be cleaned about a pivot axis so that dirt particles located on the surface are removed. The cleaning nozzles are typically provided in an area between the hood and the front window or on the rear window. The window wipers are also disposed in an area between the hood and the front window and are capable of pivoting.

However, roof assemblies or motor vehicles configured for semi-autonomous or autonomous driving, in particular, have a plurality of environment sensors and a plurality of see-through areas to be cleaned. In order to achieve effective cleaning at all times for such a vehicle structure, a plurality of electric motors and/or mechanical linkages have to be installed together with a plurality of wiper elements in order to clean each see-through area of each environment sensor. This leads to an increase in material, components and assembly required. Also, the maintenance of cleaning features of this kind is more difficult since a plurality of components have to be checked and replaced, if needed. Also, cleaning features of this kind require a large amount of installation space, which has to be provided specifically for each environment sensor. This, too, increases the overall costs for the motor vehicle. Also, a translational cleaning movement often requires for the wiper element to be guided on both sides, e.g., on a sensor housing of the environment sensor. This again increases the amount of installation space required, which is disadvantageous for the overall system structure.

SUMMARY

Overall, the disadvantages described above are to be avoided or at least minimized. Therefore, an object of the invention is to propose a roof assembly and/or a motor vehicle comprising a cleaning feature which is improved over the state of the art and which avoids or at least reduces the disadvantages described above.

The object is attained by a roof assembly according to the teaching of claim 1. The object is also attained by a motor vehicle according to the teaching of claim 2.

Advantageous embodiments of the invention are the subject matter of the dependent claims. Moreover, any and all combinations of at least two features disclosed in the description, the claims, and/or the figures fall within the scope of the invention. Naturally, the explanations given in connection with the roof assembly equivalently relate to the motor vehicle according to the invention without being mentioned separately in its context. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

The roof assembly according to the invention is intended to form a vehicle roof of a motor vehicle. The roof assembly comprises a panel component at least partially forming a roof skin of the vehicle roof, the roof skin serving as an outer sealing surface. Furthermore, the roof assembly comprises at least one environment sensor configured to send and/or receive electromagnetic signals through a see-through area in order to detect a vehicle environment. Moreover, the roof assembly comprises at least one cleaning feature and is characterized in that the cleaning feature comprises a window wiper assembly having two wiper elements which have a common pivot axis. The one wiper element is configured to clean a windshield or a rear window. The other wiper element is configured to clean the see-through area.

The motor vehicle according to the invention comprises a windshield and/or a rear window and a roof assembly. The roof assembly comprises a panel component at least partially forming a roof skin of the vehicle roof, the roof skin serving as an outer sealing surface, and at least one environment sensor configured to send and/or receive electromagnetic signals through a see-through area in order to detect a vehicle environment. Furthermore, the motor vehicle comprises at least one cleaning feature having a window wiper assembly. The motor vehicle is characterized in that the window wiper assembly comprises two wiper elements and is configured to clean the windshield or the rear window with the one wiper element and to clean the see-through area with the other wiper element, the two wiper elements having a common pivot axis disposed or provided in a roof area of the motor vehicle.

The two wiper elements are preferably each a window wiper arm and are geometrically adapted to a shape of the front or the rear window and/or the see-through area. For example, the one wiper element has a straight or an arched or curved shape which matches a curvature or a curve of the front or the rear window. For example, the other wiper element has a straight or an arched or curved shape which matches a curvature or a curve of the see-through area. The two wiper elements are preferably each mounted on the roof assembly, in particular on a roof frame or on the vehicle body, in particular on a vehicle body frame or another supporting component disposed in the roof area of the vehicle, via respective wiper arm bearings in such a manner that they can pivot about the pivot axis. The window wiper assembly preferably comprises an electric motor drive configured to pivot the one and/or the other wiper element about the pivot axis. The one wiper element preferably moves across a circle-segment-shaped surface portion (on a circular path) of the front or the rear window as it pivots. The other wiper element preferably moves across a circle-segment-shaped surface portion (on a circular path) of the see-through area as it pivots. The respective circle centers of the respective circle paths are defined by the center of gravity intersected by the pivot axis.

The idea underlying the invention consists in combining the wiper elements comprised in separate window wiper assemblies from the state of the art in a common window wiper assembly. Thus, the approach of using at least one wiper element for cleaning the front or the rear window and using a wiper element separate therefrom for cleaning the see-through area is abandoned. Instead, the invention combines the wiper element for cleaning the front or the rear window with the wiper element for cleaning the see-through area.

To this end, the pivot axis or the axis of rotation of the wiper element for cleaning the front window is shifted from a place in the area of the hood (as common in the state of the art) into a roof area according to the invention. The same pivot axis will also be used to execute the movement of the other wiper element, which cleans the see-through area. In this case, both the front or the rear window and the see-through area of the environment sensor can be cleaned using a shared pivot axis. According to the invention, the two wiper elements sit on the pivot axis and are each mounted in such a manner that they can pivot relative to the pivot axis. Particularly preferably, either wiper element can be coupled in and out with regard to a pivoting movement so that, selectively, just one wiper element or both wiper elements together can be used for cleaning.

A main advantage over the state of the art consists in the fact that the combination of the wiper element for cleaning the front or the rear window with the wiper element for cleaning the see-through area of the at least one environment sensor renders a plurality of components otherwise needed unnecessary. Thus, the solution according to the invention is more compact and more cost-efficient compared to the state of the art. Also, the installation and the maintenance of the cleaning feature according to the invention are simplified. Moreover, the wiper element for cleaning the see-through area pivots about the pivot axis instead of moving translationally, as a result of which the environment sensor in question and/or the vehicle structure in the area of the see-through area can be of a significantly more compact design compared to the state of the art. In particular, the wiper element for cleaning the see-through area does no longer require guiding on both sides.

As an alternative to the solution according to the invention, a wiper element provided for cleaning the front or the rear window could simply be elongated so that the see-through area provided above the front or the rear window in the roof area or integrated in a roof area of the front or the rear window can also be cleaned. In this case, the wiper element could still be disposed in the area of transition between the hood and the front window or between the bottom trunk lid and the rear window. However, such an approach is at a disadvantage compared to the solution according to the invention since a wiper element elongated in this manner would have a longer reaction time, in particular for cleaning the see-through area, compared to two wiper elements that can pivot independently. Also, no separate cleaning of the front or the rear window and the see-through area would be possible in this case.

The expression "at least one" as used herein means that the roof assembly according to the invention and/or the motor vehicle according to the invention can comprise one or more than one of the components in question. The expression "at least partially" means that the panel component does not have to form the entire roof skin of the vehicle; instead, it may form only a portion of the roof skin, for example. Of course, the environment sensor can also be part of a sensor module which is comprised in the roof assembly and which can comprise the environment sensor and other electrical and/or mechanical components (such as a housing, part of a housing and/or a drive). For example, the see-through area can be disposed on or formed integrally in the panel component. Alternatively or additionally, the see-through area can be comprised in a sensor housing in which the environment sensor is disposed on the roof skin in a rigid manner, for example. The see-through area can also be part of a front or rear window of the motor vehicle. The at least one environment sensor including its housing, for example, can also be disposed in an opening of the roof skin in such a manner that it can be retracted and deployed. Of course, the roof assembly and/or the motor vehicle can comprise multiple cleaning features with multiple window wiper assemblies. For example, two window wiper assemblies can be provided in the front roof area, where they clean two see-through areas of two environment sensors and the front window. For example, two window wiper assemblies can be disposed in the rear roof area, where they clean two see-through areas of two environment sensors and the rear window. In the case at hand, the see-through area can be considered a sensor see-through area.

In a preferred embodiment, the motor vehicle comprises a vehicle body frame comprising a front and/or a rear transverse rail, which is in particular oriented in a direction perpendicular to a longitudinal vehicle direction x. The pivot axis is preferably disposed in the area of the front or the rear transverse rail at the roof. In principle, the roof assembly can also comprise a roof frame. Such a roof frame can comprise at least one transverse rail on which the pivot axis is disposed. Alternatively or additionally, the pivot axis can be disposed on the panel component or in a roof area of the front or the rear window or in an area of transition between the front or the rear window and the at least one panel component.

In a preferred embodiment, the one wiper element comprises at least one wiper blade configured to be in flat contact with the windshield or the rear window in order to clean it when pivoting about the pivot axis. The at least one wiper blade preferably touches the front or the rear window and picks up dirt particles or foreign particles located thereon in order to remove them when pivoting across the surface of the front or the rear window. The wiper blade can be a rubber blade.

In a preferred embodiment, the other wiper element comprises at least one wiper blade configured to be in flat contact with the see-through area in order to clean it when pivoting about the pivot axis. The at least one wiper blade preferably touches the see-through area and picks up dirt particles or foreign particles located thereon in order to remove them when pivoting across the surface of the see-through area. The wiper blade can be a rubber blade.

In a preferred embodiment, the see-through area is formed in the windshield and/or in the rear window. For example, it can be a see-through area for a front environment sensor in the front window and alternatively or additionally a see-through area for a rear environment sensor in the rear window. In this case, the front and/or the rear window can extend "upward" (when viewed in and along a roof direction) far enough for it/them to comprise the see-through area of the environment sensor. Alternatively, the see-through area can also be formed on the panel component, e.g., disposed thereon as a window or formed integrally therein. The see-through area can also be disposed on a sensor housing of the environment sensor.

In a preferred embodiment, the window wiper assembly comprises a coupling configured to selectively couple the two wiper elements with each other in such a manner that they can pivot about the pivot axis in an interdependent manner or to decouple them in such a manner that they can pivot about the pivot axis independently or to decouple them in such a manner that only one of the two wiper elements can pivot about the pivot axis. For example, the wiper elements are mounted in such a manner that they can rotate about the pivot axis. Preferably, at least one of the wiper elements can be moved translationally along the pivot axis at the bearing for coupling and decoupling. For example, it can be moved via an electric motor linear drive. The bearing can be a wiper arm mount of the wiper element, the wiper arm mount being placed on a bearing journal. The pivot axis preferably runs concentrically through such a bearing journal. A slip clutch is also possible, in principle. In a coupled state, both wiper elements can preferably pivot about the pivot axis interdependently, i.e., for example, in a predetermined angular position and/or at a predetermined speed of rotation relative to each other. In a decoupled state, the two wiper elements can preferably pivot about the pivot axis at free angles and particularly preferably each at different pivoting speeds. For example, a gear allows the two wiper elements to pivot about the pivot axis at different pivoting speeds or speeds of rotation in the decoupled state. In a decoupled state, one wiper element can preferably pivot about the pivot axis whereas the other wiper element stays still. This is of course also possible vice versa. The wiper elements preferably undergo a purely rotational movement about the pivot axis in order to clean the area in question (i.e., the front or the rear window and/or the see-through area).

In a preferred embodiment, the roof assembly or the motor vehicle comprises a controller configured to control the coupling in such a manner that, selectively, one wiper element can clean the windshield or the rear window and/or the other wiper element can clean the see-through area. For example, the controller can be a modified window wiping controller. The controller can basically be provided at any point of the motor vehicle or the roof assembly. The controller preferably causes a drive to open or close the coupling between the two wiper elements, i.e., to couple or decouple them. Alternatively, the controller is preferably configured to control the one wiper element and/or the other wiper element and/or the coupling separately or interdependently.

In a preferred embodiment, the cleaning feature comprises at least one spray nozzle configured to spray the windshield or the rear window and/or the see-through area with a cleaning fluid in order to increase a cleaning effect of the window wiper assembly, in particular of the one and/or the other wiper element.

Preferably, the roof module comprises multiple cleaning nozzles, which can be positioned at different points of the panel component and/or the vehicle body. The cleaning feature can further have one or more than one hose line and/or a tank for a cleaning liquid. Alternatively or additionally, a tank present in the vehicle for a cleaning liquid for cleaning the front and rear windows can be used as a reservoir for the cleaning liquid of the cleaning feature. The fluid is distributed in a manner similar to the state of the art, selectively, with separately disposed cleaning nozzles and/or with cleaning nozzles integrated in the window wiper assembly, e.g., in the wiper elements. In a preferred embodiment, the at least one cleaning nozzle is disposed in a fixed place on the panel component and/or the vehicle body and can preferably rotate. The cleaning nozzle or a nozzle head of the cleaning nozzle preferably cannot move translationally while it can rotate about an axis of rotation at least in segments. The fluid cone produced by the one cleaning nozzle can preferably be directed at different points of impact on the see-through area and/or the surface to be cleaned, in particular the front and/or the rear window, by segmental rotation of the cleaning nozzle in order to be able to effectively clean partial accumulations of dirt. The cleaning cone preferably has a main axial direction along which the cleaning fluid strikes the see-through area at its highest speed (the greatest impulse), the cleaning effect being the most effective there. The cleaning fluid can preferably be an aqueous solution containing soap and/or a compressed gas.

In a preferred embodiment, the at least one spray nozzle is disposed on the one and/or the other wiper element. Alternatively or additionally, the at least one spray nozzle can be integrated in the one and/or the other wiper element. This has the advantage that the cleaning fluid can be routed through the one and/or the other wiper element. This renders integrating a nozzle in the roof area unnecessary. Moreover, this placement of the at least one cleaning nozzle leads to less overspray between the windshield and the vehicle roof.

In a preferred embodiment of the motor vehicle, the roof assembly comprises a roof module installed on a roof frame structure of the motor vehicle as a structural unit. In another preferred embodiment of the roof assembly, it comprises a roof module which can be attached to a vehicle body as a structural unit. The roof module can form a structural unit in which features for autonomous or semiautonomous driving or driving assisted by driving assistance systems are integrated and which can be attached to a vehicle carcass as a unit by a vehicle manufacturer. Furthermore, the roof module according to the invention can be a purely fixed roof or a roof including a roof opening system. Moreover, the roof module can be configured for use in a passenger car or a utility vehicle. The roof module can preferably be provided as a structural unit in the form of a roof sensor module (RSM), in which the environment sensors are provided, so as to be inserted into a roof frame of a vehicle body as a suppliable structural unit. The environment sensor according to the invention can basically be configured in various ways and can in particular comprise a lidar sensor, a radar sensor, an optical sensor, such as a (multidirectional) camera, and/or the like. Lidar sensors operate in a wavelength range of 905 nm or about 1550 nm, for example. The material of the roof skin and of the panel component in the see-through area should be transparent to the wavelength range used by the environment sensor and should hence be selected as a function of the wavelength(s) used by the environment sensor.

In a preferred embodiment, the at least one environment sensor comprises a lidar sensor and/or a radar sensor and/or a camera sensor and/or a multi-camera sensor and/or an ultrasonic sensor and/or rain sensors. Other sensor types not mentioned here and used in the area of roof modules are comprised herein.

Of course, the embodiments and the illustrative examples mentioned above and yet to be discussed below can be realized not only individually but also in any combination with each other without departing from the scope of the present invention. Moreover, any and all embodiments and illustrative examples of the roof module also relate to a motor vehicle having such a roof module.

BRIEF DESCRIPTIONS OF THE DRAWINGS

Embodiments of the invention are schematically illustrated in the drawings and will be discussed as examples below.

DETAILED DESCRIPTION

Figure 1:
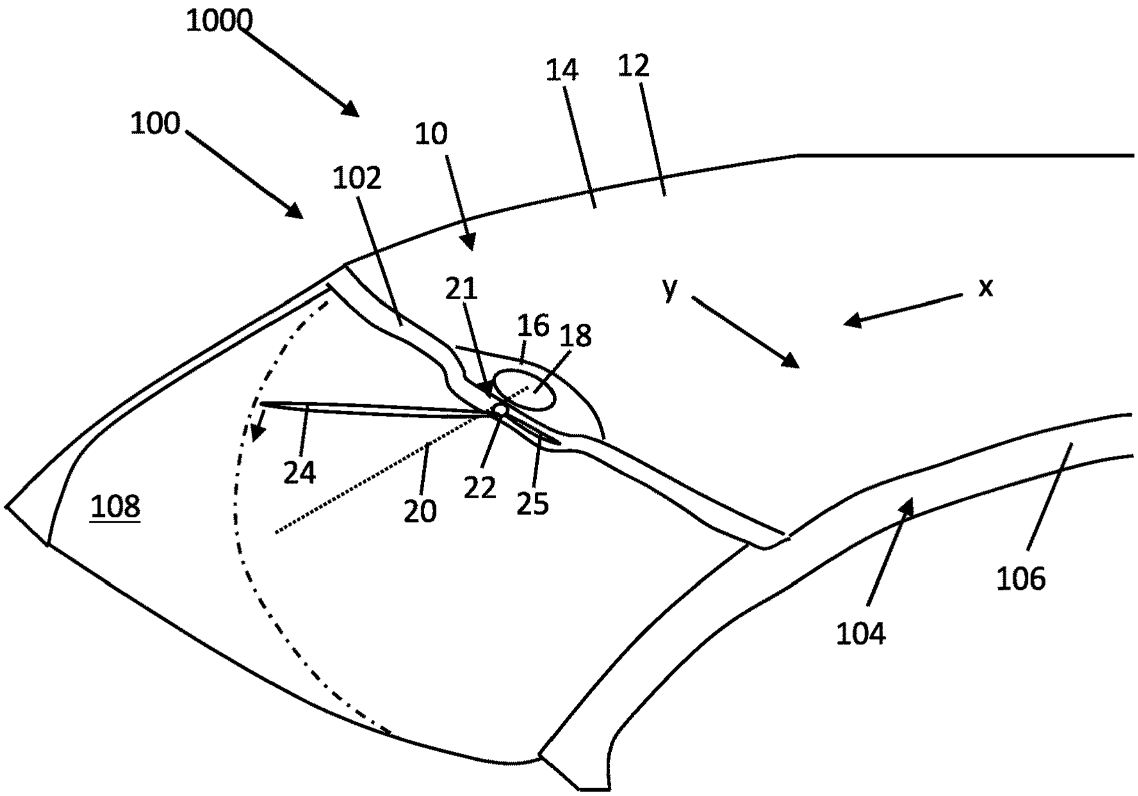
FIG. 1 is a perspective view of a vehicle roof having a roof assembly according to the invention.

FIG. 1 shows a vehicle roof 100 of a motor vehicle 1000, which comprises a roof assembly 10 according to the invention. According to FIG. 1, roof assembly 10 comprises a roof module, which is attached to or placed on top of or inserted into a roof frame 104 of vehicle 1000 as a structural unit. Roof frame 104 comprises two transverse rails 102 (only one visible) and two longitudinal rails 106.

Roof assembly 10 comprises a panel component 12 for forming a roof skin 14 of vehicle roof 100. According to FIG. 1, an environment sensor 16 is disposed in a front area of vehicle roof 100 or roof assembly 10 with respect to a longitudinal vehicle direction x. Environment sensor 16 is disposed directly behind front transverse rail 102, which defines a roof header of vehicle 1000.

In the case shown in FIG. 1, environment sensor 16 is disposed under roof skin 14 and is covered by panel component 12 in this configuration. Panel component 12 forms a housing cover of environment sensor 16. Panel component 12 forms a see-through area 18 in an area in front of environment sensor 16 with respect to longitudinal vehicle direction x. For example, see-through area 18 can be made of a preferably shatter-proof plastic or another (semi-) transparent material and can be embedded in panel component 12 as a window or be formed integrally with it. In the case at hand, environment sensor 16 is a lidar sensor, which can send and/or receive electromagnetic signals for detecting the vehicle environment through see-through area 18. Other sensor types, such as (multidirectional) cameras, can be used. Environment sensor 16 is oriented along an optical axis 20, which runs parallel to longitudinal vehicle direction x in the case of FIG. 1.

According to the invention, at least one cleaning nozzle 22 is disposed in panel component 12. In the case of FIG. 1, there are two cleaning nozzles 22, which, when viewed along optical axis 20, are disposed in front of environment sensor 16 to the right and to the left of optical axis 20. According to the invention, roof assembly 10 or motor vehicle 1000 comprises at least one cleaning feature 21. Cleaning feature 21 itself comprises a window wiper assembly 22 having two wiper elements 24 and 25, which have a common pivot axis 26. Wiper element 24 is configured to clean a windshield 108 (see FIGS. 1, 2 and 4) or a rear window 110 (see FIG. 3). Wiper element 25 is configured to clean see-through area 18. Pivot axis 26 is disposed in the roof area of motor vehicle 1000 (see FIG. 4). So windshield 108 or rear window 110 (depending on where the cleaning feature is disposed on roof assembly 10) is cleaned with wiper element 24. Wiper element cleans see-through area 18.

Figure 4:
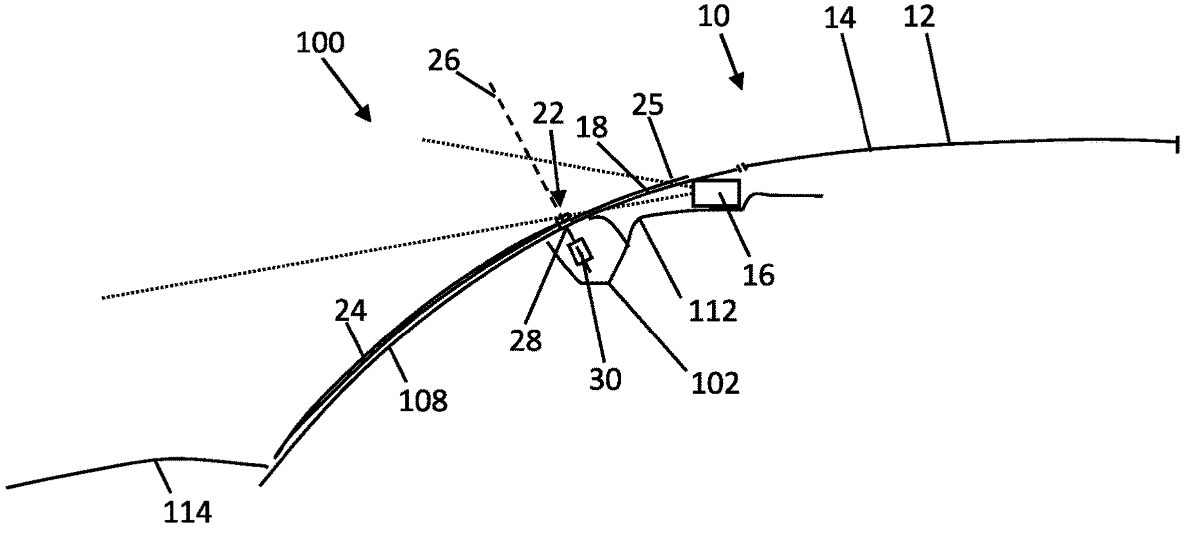
FIG. 4 is a schematic sectional view of a front area of a motor vehicle.

In the case at hand, window wiper assembly 22 comprises a coupling 28, which is configured to selectively couple wiper elements 24 and 25 with each other in such a manner that they can pivot about pivot axis 26 in an interdependent manner or to decouple them in such a manner that they can pivot about pivot axis 26 independently or to decouple them in such a manner that only one of wiper elements 24 and 25 can pivot about pivot axis 26. The coupling is schematically illustrated in FIG. 4. Window wiper assembly 22 further comprises an in particular electric motor drive 30, which is configured to pivot wiper element 24 and/or wiper element 25 about pivot axis 26. Wiper element 24 preferably moves across a circle-segment-shaped surface portion of front window 108 or rear window 110 (indicated by a first wiper movement path 32) as it pivots. Wiper element 25 preferably moves across a circle-segment-shaped surface portion of see-through area 18 (indicated by a second wiper movement path 34) as it pivots.

Figure 2:
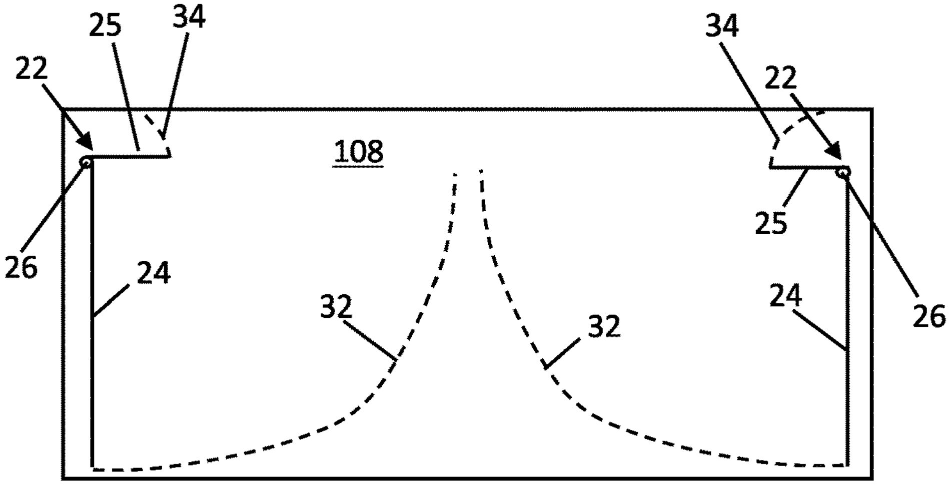
FIG. 2 shows a first exemplary embodiment of a cleaning feature.
Figure 3:
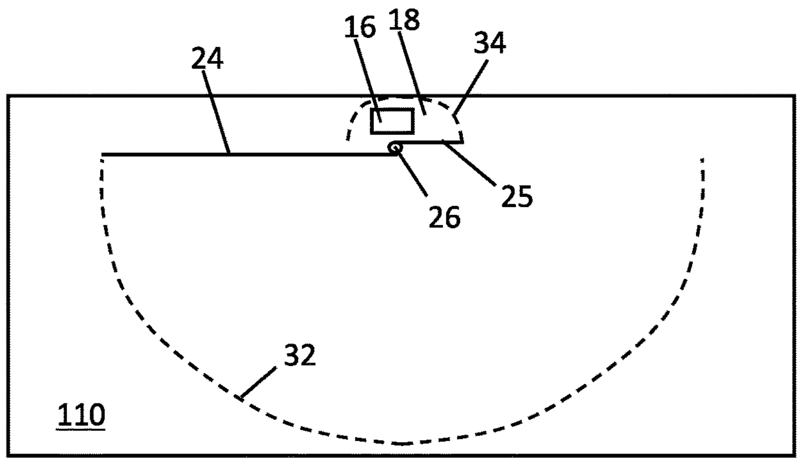
FIG. 3 shows a second exemplary embodiment of a cleaning feature.

According to FIG. 2, two window wiper assemblies 22 are disposed on the right and on the left in the roof area above or in the upper corner area of front window 108. According to FIG. 3, a window wiper assembly 22 is disposed in a middle area (with respect to vehicle width direction y) of rear window 110.

FIG. 4 shows that environment sensor 16 is installed below roof skin 14 and front window 108, e.g., on a body or frame part 112. Furthermore, motor vehicle 1000 comprises a schematically indicated hood 114. According to FIG. 4, front window 108 is elongated over front transverse rail 102, i.e., the header, rearward in the direction of a vehicle rear end with the result that environment sensor 16 looks through see-through area 18, which is integrated in front window 108 in the roof area of front window 108.

Figure 5:
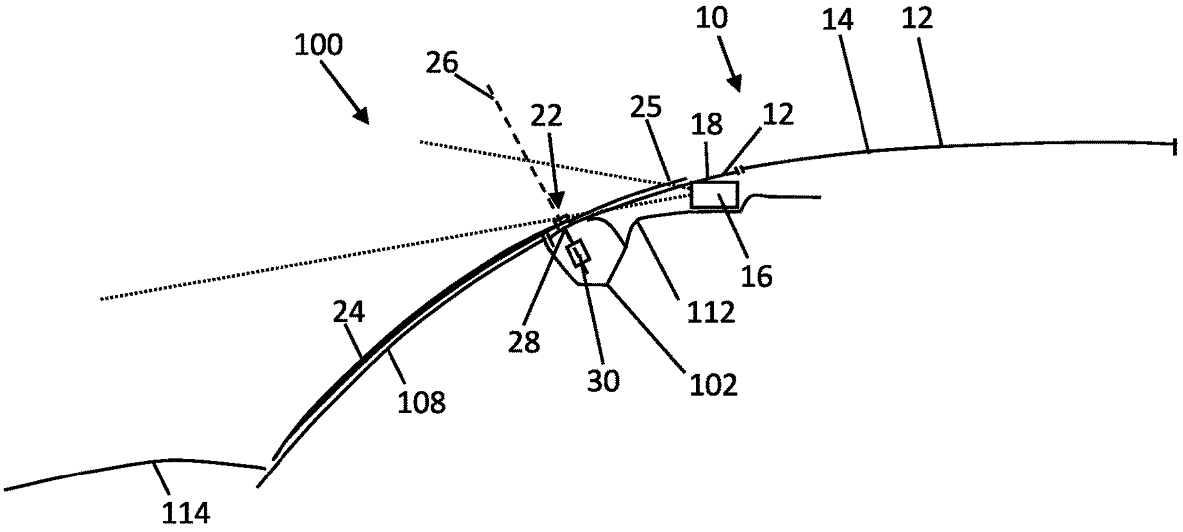
FIG. 5 is a schematic sectional view of a front area of a motor vehicle.

FIG. 5 shows that environment sensor 16 is mounted below panel component 12, which comprises the see-through area, e.g., on body or frame part 112. According to FIG. 5, front window 108 ends at front transverse rail 102. Panel component 12, which is a see-through area 18, is adjacent thereto with the result that environment sensor 16 looks through see-through area 18. The roof assembly according to this embodiment comprises at least two panel components 12, which form roof skin 14.

The invention claimed is:

1. A roof assembly for forming a vehicle roof of a motor vehicle, the roof assembly comprising:

a panel component at least partially forming a roof skin of the vehicle roof, the roof skin serving as an outer sealing surface, at least one environment sensor configured to send and/or receive electromagnetic signals through a see-through area to detect a vehicle environment, and at least one cleaning feature, wherein the cleaning feature comprises a window wiper assembly having two wiper elements which have a common pivot axis, the one wiper element being configured to clean a windshield or a rear window and the other wiper element being configured to clean the see-through area, and wherein the two wiper elements are mounted on the common pivot axis and the two wiper elements are each mounted so as to be pivotable relative to the common pivot axis.

2. The roof assembly according to claim 1, wherein the see-through area is provided on or formed integrally with the panel component.

3. The roof assembly according to claim 1, wherein the cleaning feature comprises at least one spray nozzle configured to spray the windshield or the rear window and/or the see-through area with a cleaning fluid to increase a cleaning effect of the window wiper assembly of the one and/or the other wiper element.

4. The roof assembly according to claim 1, wherein the at least one spray nozzle is disposed on the one and/or the other wiper element and/or an at least one spray nozzle is integrated in the one and/or the other wiper element.

5. The roof assembly according to claim 1, wherein the roof assembly comprises a roof module configured to be attached to a vehicle body as a structural unit.

6. A motor vehicle comprising:

a windshield and/or a rear window;

a roof assembly having a panel component at least partially forming a roof skin of the vehicle roof, the roof skin serving as an outer sealing surface, and at least one environment sensor configured to send and/or receive electromagnetic signals through a see-through area to detect a vehicle environment; and at least one cleaning feature having a window wiper assembly, wherein the window wiper assembly comprises two wiper elements and is configured to clean the windshield or the rear window with the one wiper element and to clean the see-through area with the other wiper element, the two wiper elements having a common pivot axis disposed in a roof area of the motor vehicle;

wherein the window wiper assembly comprises a coupling configured to selectively couple the two wiper elements with each other in such a manner that they can pivot about the pivot axis in an interdependent manner or to decouple the two wiper elements in such a manner that they can pivot about the pivot axis in an independent manner or to decouple the two wiper elements in such a manner that only one of the two wiper elements can pivot about the pivot axis.

7. The motor vehicle according to claim 6, wherein the motor vehicle has a vehicle body frame comprising a front and/or a rear transverse rail, which is oriented perpendicular to a longitudinal vehicle direction x, and the pivot axis is disposed in an area of the front or rear transverse rail at the roof.

8. The motor vehicle according to claim 6, wherein the one wiper element comprises at least one wiper blade configured to be in flat contact with the windshield or the rear window to clean it when pivoting about the pivot axis.

9. The motor vehicle according to claim 6, wherein the other wiper element comprises at least one wiper blade configured to be in flat contact with the see-through area to clean it when pivoting about the pivot axis.

10. The motor vehicle according to claim 6, wherein the see-through area is formed in the windshield and/or in the rear window.

11. The motor vehicle according to claim 6, wherein the motor vehicle comprises a controller configured to control the coupling in such a manner that, selectively, the one wiper element cleans the windshield or the rear window and/or the other wiper element cleans the see-through area.

12. The motor vehicle according to claim 6, wherein the motor vehicle comprises a controller configured to control the one wiper element and/or the other wiper element and/or the coupling.

13. The motor vehicle according to claim 6, wherein the see-through area is provided on or formed integrally with the panel component.

14. The motor vehicle according to claim 6, wherein the cleaning feature comprises at least one spray nozzle configured to spray the windshield or the rear window and/or the see-through area with a cleaning fluid to increase a cleaning effect of the window wiper assembly of the one and/or the other wiper element.

15. The motor vehicle according to claim 6, wherein the at least one spray nozzle is disposed on the one and/or the other wiper element and/or an at least one spray nozzle is integrated in the one and/or the other wiper element.

16. The motor vehicle according to claim 6, wherein the roof assembly comprises a roof module installed on a roof frame structure of the motor vehicle as a structural unit.

17. A roof assembly for forming a vehicle roof of a motor vehicle, the roof assembly comprising:

a panel component at least partially forming a roof skin of the vehicle roof, the roof skin serving as an outer sealing surface, at least one environment sensor configured to send and/or receive electromagnetic signals through a see-through area to detect a vehicle environment, and at least one cleaning feature, wherein the cleaning feature comprises a window wiper assembly having two wiper elements which have a common pivot axis, the one wiper element being configured to clean a windshield or a rear window and the other wiper element being configured to clean the see-through area, and wherein the window wiper assembly comprises a coupling configured to selectively couple the two wiper elements with each other in such a manner that they can pivot about the pivot axis in an interdependent manner or to decouple the two wiper elements in such a manner that they can pivot about the pivot axis in an independent manner or to decouple the two wiper elements in such a manner that only one of the two wiper elements can pivot about the pivot axis.

18. The roof assembly according to claim 17, wherein the roof assembly comprises a controller configured to control the coupling in such a manner that, selectively, the one wiper element cleans the windshield or the rear window and/or the other wiper element cleans the see-through area.

19. The roof assembly according to claim 17, wherein the roof assembly comprises a controller configured to control the one wiper element and/or the other wiper element and/or the coupling.

* * * * *